United States Patent [19]
Baksh et al.

[11] Patent Number: 6,007,606
[45] Date of Patent: Dec. 28, 1999

[54] PSA PROCESS AND SYSTEM

[75] Inventors: Mohamed Safdar Allie Baksh; Frank Notaro, both of Amherst, N.Y.

[73] Assignee: Praxair Technology, Inc., Danbury, Conn.

[21] Appl. No.: 08/987,791

[22] Filed: Dec. 9, 1997

[51] Int. Cl.[6] ................................................ B01D 53/053
[52] U.S. Cl. ............................. 95/98; 95/101; 95/105; 95/117; 95/139
[58] Field of Search .................. 95/96–98, 100–105, 95/116–119, 121, 122, 130, 135–140

[56] References Cited

U.S. PATENT DOCUMENTS

| | | | |
|---|---|---|---|
| 3,788,036 | 1/1974 | Lee et al. ................................. | 95/101 |
| 4,263,018 | 4/1981 | McCombs et al. ..................... | 95/98 X |
| 4,340,398 | 7/1982 | Doshi et al. ............................ | 95/103 |
| 4,468,237 | 8/1984 | Fuderer .................................. | 95/100 |
| 4,816,039 | 3/1989 | Krishnamurthy et al. ............ | 95/97 |
| 5,250,088 | 10/1993 | Yamaguchi et al. .................. | 95/98 |
| 5,258,059 | 11/1993 | Yamaguchi et al. .................. | 95/116 X |
| 5,370,728 | 12/1994 | LaSala et al. .......................... | 95/130 X |
| 5,505,765 | 4/1996 | Kaaji et al. ............................. | 95/103 X |
| 5,518,526 | 5/1996 | Baksh et al. ............................ | 95/130 X |
| 5,565,018 | 10/1996 | Baksh et al. ............................ | 95/105 X |
| 5,620,501 | 4/1997 | Tamhankar et al. .................. | 95/96 X |
| 5,658,371 | 8/1997 | Smolarek et al. ..................... | 95/105 X |
| 5,702,504 | 12/1997 | Schaub et al. ......................... | 95/105 X |
| 5,735,938 | 4/1998 | Baksh et al. ............................ | 95/105 X |

Primary Examiner—Robert Spitzer
Attorney, Agent, or Firm—Robert J. Follet

[57] ABSTRACT

A PSA process involving the storage of products of various purities in segregated storage tanks for subsequent usage is disclosed. Products of increasing purities, admitted at the product end of the bed, are used during purging and repressurization steps. In addition, different composition streams collected at the feed end of the bed during the countercurrent depressurization step are admitted at the feed end of the bed, in the order of increasing product component content, during the rising pressure step(s). This cycle gives higher recovery and lower bed size factor than prior art PSA cycles.

4 Claims, 13 Drawing Sheets

PSA PROCESS AND SYSTEM

FIELD OF THE INVENTION

This invention relates to a pressure swing adsorption (PSA) process and system. More particularly the invention relates to the production of hydrogen gas via pressure swing adsorption (PSA).

BACKGROUND OF THE INVENTION

There are a variety of known processes for producing hydrogen. Some examples include the following: (1) steam reforming of natural gas or naphtha, (2) catalytic reforming of hydrocarbons, e.g. gasoline and fuel oil, and (3) partial oxidation of heavy oils or natural gas. In the aforementioned processes, steam reforming of natural gas is probably the most widely used process for hydrogen production. FIG. 1 shows the key process units in a steam methane reforming process to produce hydrogen. Referring to FIG. 1, a feedstock, e.g., natural gas is compressed and fed to a purification unit to remove sulfur compounds. The desulfurized feed is then mixed with superheated steam and fed to a reformer to produce primarily $H_2$ and CO. The effluent stream from the reformer is sent to a heat recovery unit, then to a shift converter to obtain additional hydrogen. The effluent from the shift converter goes through a process cooling and recovery unit prior to sending to a purification unit (e.g. PSA) to produce high purity hydrogen. The following gives a brief introduction of some of the prior art processes for producing hydrogen.

Sircar et al., in U.S. Pat. No. 4,077,779, describe an improved four bed hydrogen PSA process; wherein, a cocurrent displacement step, commonly referred to as high pressure rinse step, is used prior to depressurization of each adsorbent bed. By using a high pressure rinse step prior to depressurization of the bed, enhanced light component recovery is achieved. In addition, according to this invention, an evacuation step is used between the purging and repressurization steps, and high purity $H_2$ (99–99%) can be produced at high recovery (96.5%) from a feed of 75% $H_2$ and 25% $CO_2$.

Fuderer et al., in U.S. Pat. No. 5,553,981, disclose a process for enhancing hydrogen recovery by combining shift conversion, scrubbing and PSA. Carbon dioxide is mainly removed by scrubbing. Hydrogen is then purified by PSA. The recycling of a portion of the waste from PSA system to shift conversion unit improves the hydrogen recovery. In an example case, $H_2$ can be finally purified by PSA up to 99.99% from a feed typically around 97% after methanation. The recovery can reach 99% if 80% of PSA waste is recycled to the shift converter, 15% is recycled to the partial oxidation unit and 5% is discharged for use as fuel gas.

In U.S. Pat. No. 5,152,975, Fong et al., disclosed a process for producing high purity hydrogen. The basic steps in the process include the following: (1) partially oxidizing a gaseous hydrocarboneous feedstock to produce a synthesis gas mixture of $H_2$ and CO, (2) reacting the synthesis gas mixture with steam to convert CO into a raw gas mixture that primarily contains $CO_2$ and $H_2$, and (3) passing the raw gas mixture to a PSA process to produce high purity hydrogen and a reject gas mixture of impurities.

Kapoor et al., in U.S. Pat. No. 5,538,706, disclose a process for hydrogen and carbon monoxide production from hydrocarbons. It consists of partial oxidation and PSA separation, and cryogenic distillation as one possibility. The system provides a better performance by improving PSA separation and reducing starting materials. The partial oxidation reactor produces high purity hydrogen and carbon monoxide. Hydrogen and carbon monoxide are separated from the gas mixture (containing carbon dioxide, methane and water vapor, etc.) by a combination of PSA and distillation or possibly only PSA. At least one stream rich in high hydrocarbons (and water vapor etc.) is recycled to the reactor. A preferred embodiment of PSA system comprises serially connected adsorption zones (or beds of zeolite 5A or 13X), in each zone carbon monoxide is less strongly adsorbed than higher hydrocarbons, carbon dioxide and water vapor, but more strongly than hydrogen. According to this invention, a basic PSA cycle is used, and the depressurization/desorption step is divided into two parts: the first part, middle depressurization during which the top bed undergoes countercurrent depressurization while the bottom bed undergoes cocurrent depressurization, and carbon monoxide is withdrawn between two adsorption beds; the second part is a normal countercurrent depressurization for both beds. The process can produce, as claimed, at least 98% pure hydrogen and carbon monoxide, and the gas entering the PSA unit has about 55% $H_2$ and 42% CO.

McCombs et al., in U.S. Pat. No. 4,263,018, disclose a pressure swing adsorption process utilizing at least two adsorption beds, and a storage tank that is either an empty tank or a packed bed. The storage tank is used for storing equalization falling gas from the top of the bed that is subsequently used to pressurize another bed during the equalization rising step. This invention practices a sequential refluxing strategy wherein the void gas captured during the equalization falling step is returned in the order of increasing purity during the equalization rising step. In addition, this invention discloses the use of bottom-to-bottom bed equalization step; wherein, the bed receiving the bottom equalization rising gas is also receiving feed simultaneously, i.e., uninterrupted feed during the bottom-to-bottom bed equalization step.

Yamaguchi et al., in U.S. Pat. No. 5,258,059, describe a PSA process using at least three adsorbent beds and a holding column (segregated storage tank) of the feed-in/feed-out sequence retaining type. The holding column is used for storing the void gas recovered during the cocurrent depressurization step of the cycle. This gas is then used for purging of the adsorbent bed during the regeneration step of the cycle. This holding column is specifically designed to prevent gas from mixing, i.e., an impurity concentration gradient exists in this holding column. This invention is restricted to the use of at least three adsorbent beds and a holding column to store cocurrent depressurization gas that is subsequently used for purging. It does not describe for example, how this holding column can supply both the purge gas and product pressurization gas in advanced PSA cycles.

Baksh et al. in U.S. Pat. No. 5,565,018, disclose the use of segregated external gas storage tanks to store gases of varying purity for later use, in the order of increasing purity, in the purging, equalization rising, and product pressurization steps of the PSA cycle. Significant reduction in both the bed size factor and power consumption are achieved with this novel PSA cycle.

Although, many modifications and variations of the basic PSA cycle have been studied and applied to commercial processes, such as for the production of hydrogen from synthesis gas, yet PSA processes remain inefficient and uneconomical for high purity production of hydrogen for large plants when compared to the alternative methods. In particular, current PSA processes (such as those disclosed above) both produce an enriched product having a purity that is averaged over the whole "make product" step and possess several inherent problems.

For example, during the top-to-top bed equalization step, the bed going through the equalization rising step receives product gas with decreasing purity. Consequently, at the end of this equalization rising step, the lowest purity gas is at the product end of the bed. Thus, during the subsequent make product step, the product purity spikes downwards, which when averaged over the whole production step, decreases the purity of the product. In addition, the gas used for purging is of decreasing purity when obtained from another bed currently in the make product step. If this purge gas was obtained from a storage tank, then a constant purity gas is used for purging. Also, a similar problem (using products of decreasing purity) exists in PSA cycles that utilized a product pressurization step in the PSA cycle, wherein, the product gas was obtained from another bed in the production step.

Typically, in prior art $H_2$ PSA cycles, the bed going through the equalization rising step receives product gas with decreasing purity. Consequently, at the end of this equalization rising step, the lowest purity gas is at the product end of the bed. In addition, the gas used for purging of the adsorbent bed was obtained during a second stage equalization falling step, and is used in the order of decreasing purity. The statements made for the equalization and purging steps are equally valid for the gas used in PSA cycles that utilized a product pressurization step. In addition, during the bottom-to-bottom bed equalization step, the bed that is being pressurized is receiving gas of decreasing hydrogen concentration, starting with a $H_2$ concentration that is equal to the feed concentration, and as the bottom-to-bottom bed equalization step continues, the hydrogen concentration at the feed end of the bed drops due to heavy component(s) desorption.

The aforementioned concentration degradation, i.e., gas of decreasing $H_2$ concentration, is being used for refluxing and repressurization, giving rise to process irreversibility and mixing losses, viz, a degradation in the PSA process efficiency. For example, during the purge step and top-to-top bed equalization step, gas of decreasing $H_2$ concentration is being used for refluxing. During the bottom-to-bottom bed equalization step, at the start of the equalization, the $H_2$ mole fraction is about 0.7403 (same as the feed concentration in synthesis gas), and as the bottom-to-bottom equalization progresses, the hydrogen mole fraction at the feed end of the bed falls from about 0.74 to about 0.65. Thus, in order to maintain desired product purity in prior art PSA cycles, the production and equalization falling steps must be terminated much earlier than the time required for the bed to breakthrough. This results in a failure to fully utilize the adsorbent bed.

Further, by using products of decreasing purities, for example during purging and repressurization steps, additional contamination of the product end of the bed results, due to the use of the lowest purity product gas at the end of the refluxing steps. This added contamination of the product end of the bed brings about a significant reduction in the product purity in the early stage of the make product step. This causes a decrease of the average purity of the product, or for a given purity, a significant reduction in product (light component) recovery. In addition, by using product gas of decreasing purity, the spreading of the mass transfer zone is enhanced. Finally, in order to contain the mass transfer zone and maintain product purity, more adsorbent is required, resulting in higher bed size factor and a more costly PSA process.

OBJECTS OF THE INVENTION

It is therefore an object of this invention to provide a highly efficient PSA process for producing large volumes of high purity hydrogen from a hydrogen feed mixture (e.g., synthesis gas) with higher $H_2$ recovery, lower power requirement, and bed size factor than prior art PSA cycles. It is a further object of the invention to produce multiple purity products that can be used in different steps of the PSA cycle, or for use at specified time within a step.

SUMMARY OF THE INVENTION

The invention preferably comprises a PSA process involving storing of products of various purities in segregated storage tanks for subsequent usage. Products of increasing purities, admitted at the product end of the bed, may be used during purging and repressurization steps. In addition, different composition streams collected at the feed end of the bed during the countercurrent depressurization step is admitted at the feed end of the bed, in the order of increasing product content, during the rising pressure step(s). This cycle gives higher product recovery and lower bed size factor than prior art PSA cycles having no concentration reversal.

BRIEF DESCRIPTION OF THE DRAWINGS

Other objects, features and advantages will occur to those skilled in the art from the following description of preferred embodiments and the accompanying drawings in which.

DETAILED DESCRIPTION OF THE INVENTION

Figure 1:
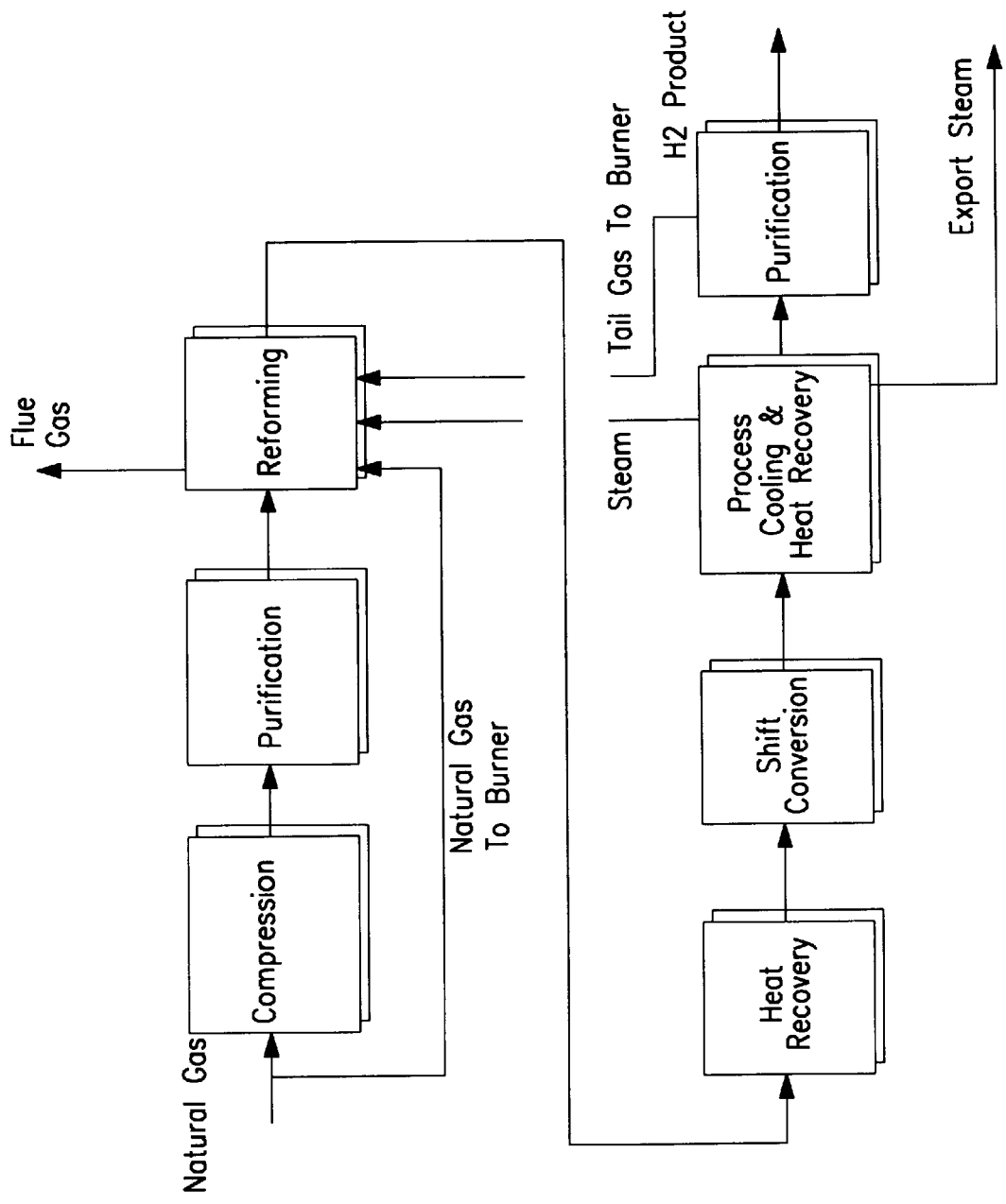
FIG. 1 is a process flow diagram showing how steam/methane reforming integrates with PSA to produce high purity hydrogen.

This invention discloses high efficiency PSA processes for hydrogen production by reducing the irreversibility and associated gas mixing losses that are present in prior art PSA processes.

The invention possesses the following features:

(1) Novel PSA cycles using sequential refluxing at both ends of the bed, i.e., product (light component) in the order of increasing purity at the product end of the bed, and gas of increasing hydrogen (the light component) concentration at the feed end during repressurization step(s) of the PSA cycle;

(2) Reduction of process irreversibility and gas mixing losses, via the use of segregated storage tank(s);

(3) Novel PSA cycles using sequential refluxing for two and four beds PSA processes;

(4) Enhanced $H_2$ recovery and productivity, and (5) Simultaneous top-to-top and bottom-to-bottom equalizations with concentration reversal at both ends of the bed, viz, the use of segregated storage tank(s) at both ends of the bed.

In order to use the lowest hydrogen purity gas at the start of refluxing, followed by gas of increasing hydrogen purity during purging and repressurization steps, it is necessary to produce multiple hydrogen concentration products. According to this invention, the highest purity gas for refluxing (purging and top-to-top bed equalization) is used last, and gas of increasing $H_2$ concentration is also used at the feed end during repressurization step(s). Thus, we need a reversal of the $H_2$ concentrations at both ends, viz the use of segregated storage tanks at both ends of the bed.

Since multiple purity products are required for purging and repressurization, the PSA cycle becomes inherently more complicated, and several modes of operation can be envisioned. For example, if hydrogen concentration reversal is required at both ends of the bed, then two segregated storage tanks can be used, one at each end of the bed. Typical segregated storage tank designs could be of the type described by Yamaguchi et al., U.S. Pat. No. 5,258,059, or could be a vessel packed with layer(s) of adsorbent(s) or inert materials, or simply an empty column containing baffles to suppress mixing.

By incorporating segregated storage tanks in the PSA cycle, we are able to store multiple hydrogen concentration gases, which can be used in the order of increasing hydrogen concentration for purging and repressurization. For example, the gas collected during the equalization falling step is stored in the segregated storage tank. At the beginning of the equalization rising step, the lowest purity gas from the segregated storage tank is consumed first, then product of increasing purity is used at a later time. Thus, during the equalization falling step product gas of decreasing purities enters the segregated storage tank, and leaves the storage tank in the reverse order (increasing product purities) during the equalization rising step. Similarly, by using another segregated storage tank at the feed end of the bed, the gas collected at the feed end of the during depressurization is used in the order of increasing hydrogen concentration during the bottom-to-bottom equalization rising step.

The incorporation of the segregated storage tanks in the PSA cycle to facilitate purity reversal at both ends of the bed, allows for greater process flexibility and improvements in efficiency, when compared to prior art cycles. In particular, for a given PSA cycle, the inclusion of the segregated storage tanks at both ends of the bed in accordance with this invention, results in 10–15% higher $H_2$ recovery when compared with PSA cycles that do not utilize hydrogen concentration reversal during purging and repressurization steps e.g., top-to-top and bottom-to bottom bed equalization steps.

A preferred embodiment of the invention consists of the utilization of a segregated storage tank(s) in the PSA cycle to store gases of various purities obtained from one or both ends of the bed. These variable purity gases are then used in the order of increasing concentration for purging and repressurization.

For example, in the bottom-to-bottom bed equalization step, gas of lowest hydrogen concentration is used in the early stage of repressurization at the feed end, then gas of increasing hydrogen content, up to the feed concentration, is used in the latter stage of repressurization. Thus, at the end of the bottom-to-bottom equalization rising step, the concentration at the feed end of the bed coincides with the feed gas concentration. During the subsequent feed step(s), the concentration at the feed end of the bed matches exactly the incoming feed, thereby reducing process irreversibility and mixing losses in the PSA process.

In addition, at the product end of the bed, gas of increasing $H_2$ purity is used for purging and repressurization. Note that the use of concentration reversals at both ends of the bed is quite different from prior art PSA cycles. In those cycles, product of constant purity, or product of decreasing purity (obtained from another bed in the production step) are used for refluxing at the top of the bed, and gases of decreasing $H_2$ concentration are used during the bottom-to-bottom equalization step. Thus, the inclusion of the segregated storage tank enables the production of multiple purity gases at both ends of the bed in various quantities for refluxing and repressurization. Also, by using additional segregated storage tanks to capture gases of various purities during the high pressure adsorption step(s) the process provides the capability for supplying the necessary amounts of each purity gas to meet product demand of customers.

The PSA process of this invention will be described with reference to the drawings and a particularly preferred embodiment. The feed to the PSA process is synthesis gas having a composition about 74% $H_2$, 22.5% $CO_2$, and trace levels of CO, $CH_4$, $N_2$, and $H_2O$.

Figure 2:
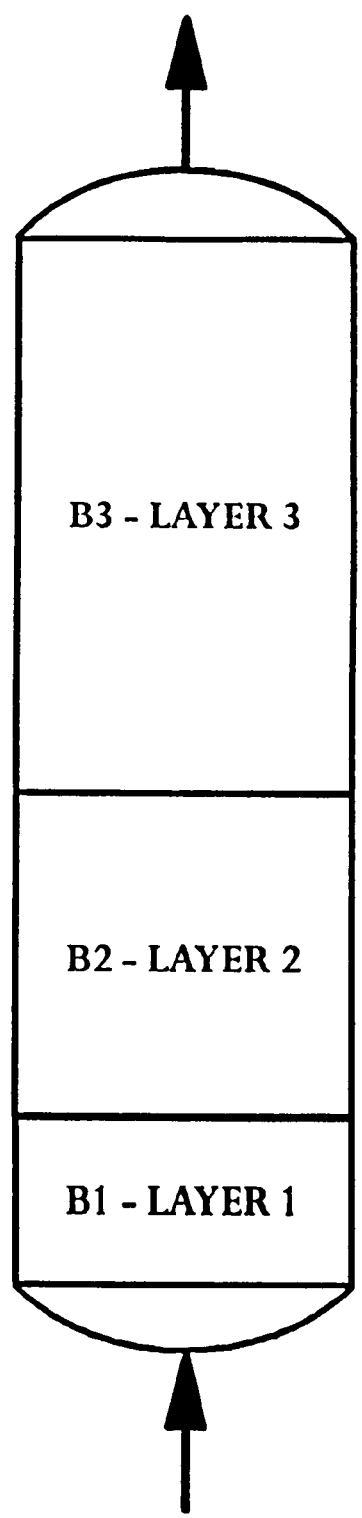
FIG. 2 is a schematic diagram of a PSA adsorption column containing three layers of adsorbents.

FIG. 2 shows a PSA adsorption column containing three layers of adsorbents to remove the impurities from the synthesis gas for producing high purity hydrogen. The first layer (B1) primarily removes $H_2O$ from synthesis gas, and the adsorbent is alumina, or zeolite-Y, or alumina mixed with zeolite-Y. The second layer (B2), commonly referred to as the bulk separation zone, removes primarily $CO_2$ from the synthesis gas, and the adsorbent is activated carbon or zeolite. The third layer (B3) is a zeolite based adsorbent that removes the residual impurities to produce high purity hydrogen as the desired product.

The basic features of the invention can be illustrated by describing the operation of a four-bed PSA process for $H_2$ production from synthesis gas. It should be noted that the scope of this invention is not limited to hydrogen production, and the key features of this invention could also be applied to other PSA separation processes, e.g air separation to produce oxygen using zeolite as the adsorbent, or in the production of $N_2$ from air using $O_2$ selective adsorbents. The process/apparatus of the system may also be used in various purification processes, e.g., crude argon purification to produce ultra high purity argon. In addition, although the features of this invention are illustrated using a four bed PSA process to produce H₂ from synthesis gas, the process may also be employed with fewer than four beds or more than four beds.

In the four bed hydrogen cycle, preferred total cycle times may range from about 2 to about 16 minutes, preferably 2 to 8 minutes. The purity of hydrogen recovered is preferably between about 99 to about 99.9999 vol. % hydrogen, preferably 99.99 vol. %. Preferred product recovery ranges from about 80 to about 95%, preferably 95%.

Figure 3:
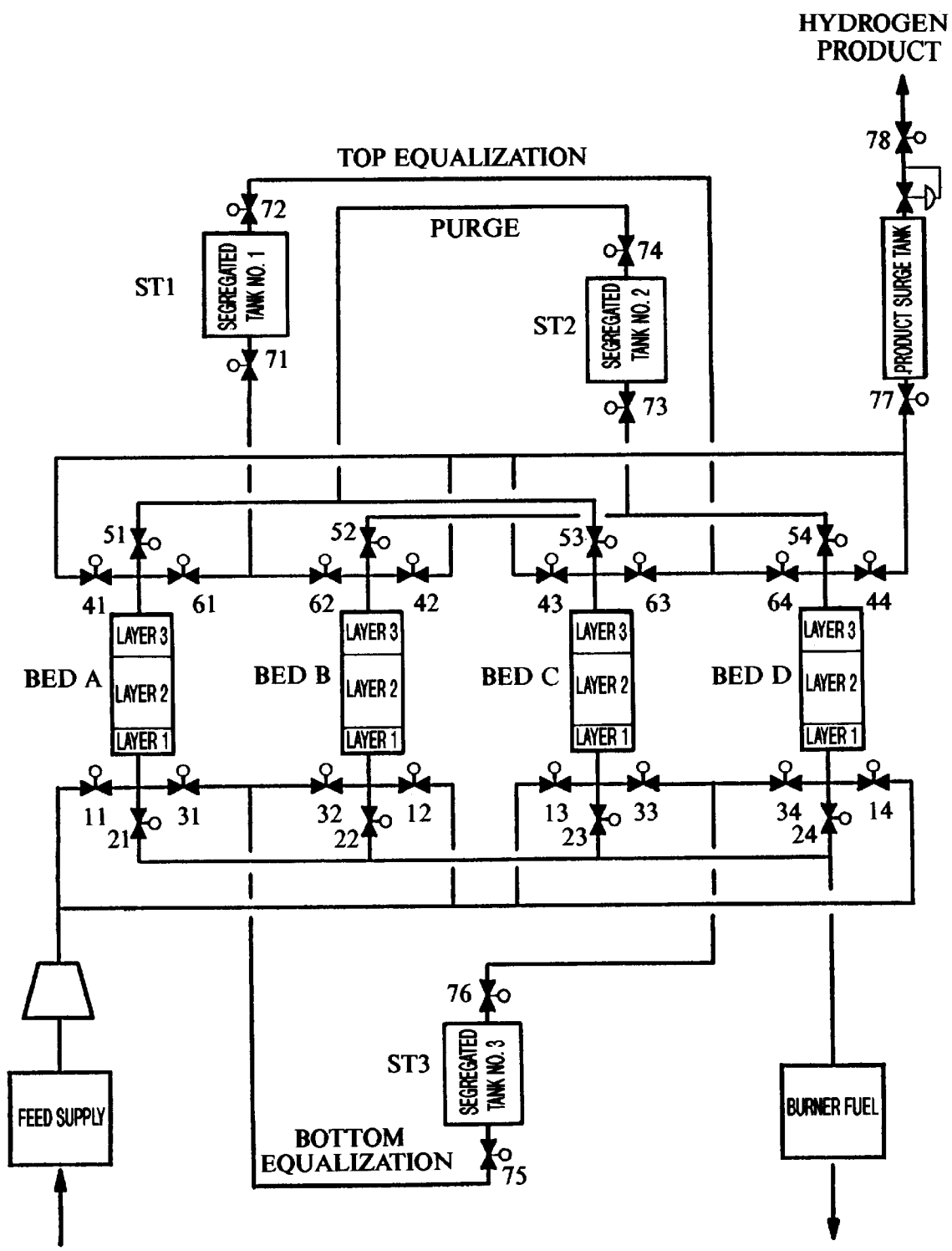
FIG. 3 is a schematic diagram of a four bed PSA process using reverse concentration profiles at both ends of the bed.

FIG. 3 is a schematic diagram of a four-bed PSA process consisting of four adsorption beds, a feed compressor or blower, and three segregated storage tanks (ST1, ST2, and ST3), and interconnected lines and valves.

In order to more particularly describe the invention, preferred features will be illustrated via an example of using a four bed PSA process to produce H₂ from synthesis gas. All the valves in the diagram are operated electronically via a computer system and program logic.

Figure 4:
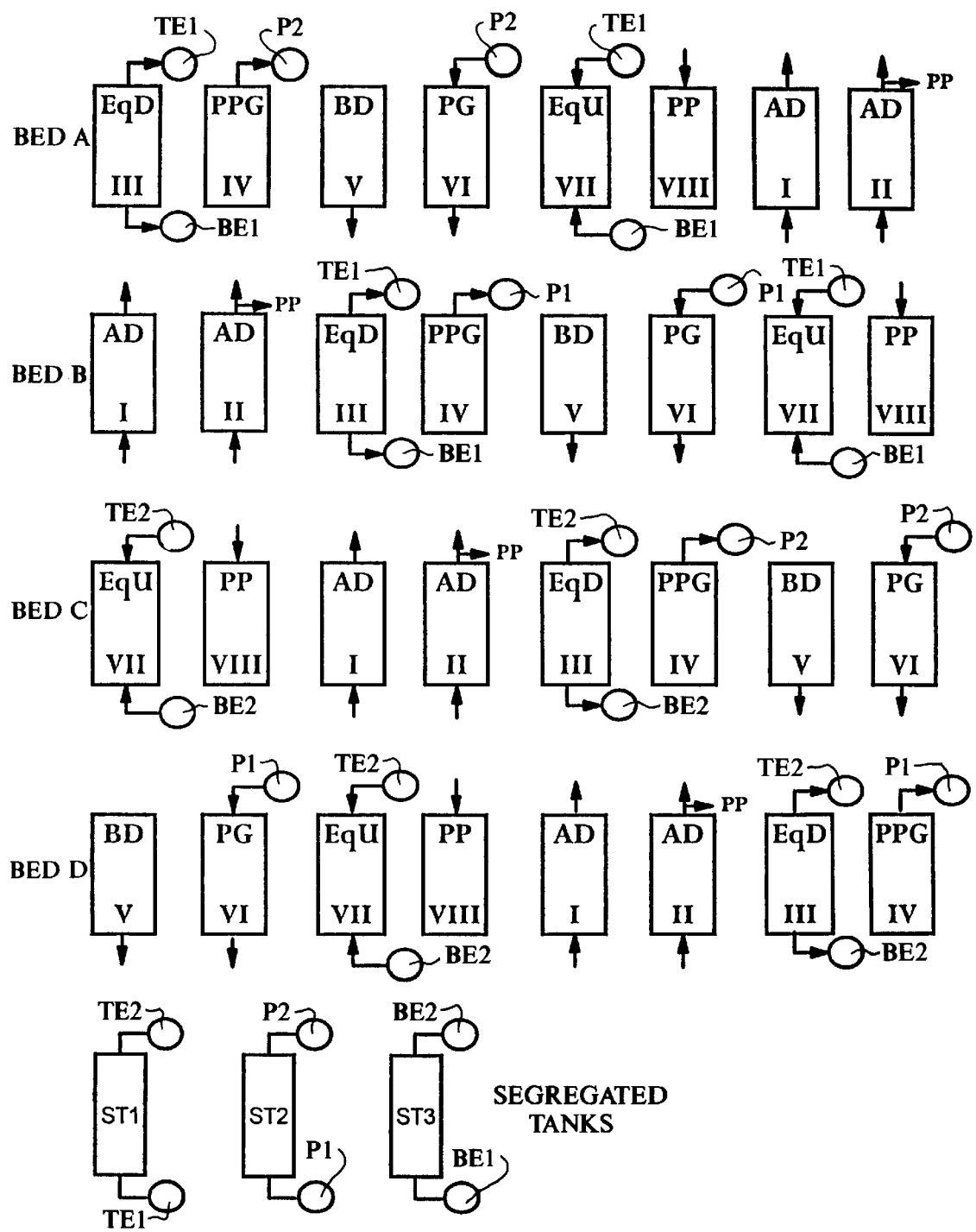
FIG. 4 is a schematic diagram of a preferred process of the invention using a four bed PSA column cycle with concentration reversal at both ends of the bed.

Consider the cycle to start after Bed B has completed the product pressurization (PP) step. Now referring to FIGS. 3–4, the following describes the sequence of steps that Bed B goes through using the preferred mode of operation. Note that AD=Adsorption; PP=Product Pressurization; EQD= Equalization Down; PPG=Provide Purge Gas; BD=Blowdown; PG=Purge; EQU=Equalization Up.

Step I: (AD): Feed gas (e.g., synthesis gas) is introduced at the bottom of the bed and product is withdrawn from the top. In our example, valves 12, 42, 77 and 78 (see FIG. 3) are opened to allow the feed gas to flow through the bed. During the same time, valve 24 is opened and Bed D undergoes countercurrent depressurization to supply burner fuel. In addition, valves 31, 33, 61, 63, 71, 72, 75 and 76 are opened, and Beds A and C undergo simultaneous top-to-top and bottom-to-bottom bed equalization via segregated tanks ST1 and ST3, respectively.

Step II: (AD & PP): Valves 12, 42, 77 and 78 remain open as in Step I. In addition, valve 43 is opened. This provides product pressurization gas to Bed C. In addition, valves 24, 51, 54, 73 and 74 are opened and Bed A continues to depressurize while supplying purge gas to Bed D via segregated tank No. 2 (ST2).

Step III: (EQD): Valves 12, 42, 43, 77 and 78 are closed; valves 32, 34, 62, 64, 71, 72, 75 and 76 are open. The bed is allowed to partially depressurize. Valves 32 and 75 allow gas from the bottom of Bed B to pressurize the bottom equalization vessel, Segregated Tank No. 3 (ST3). Valves 62, 64, 71 and 72 allow gas from the top of Bed B to pressurize the top of Bed D via, Segregated Tank No. 1 (ST1). In addition, valves 24, 51, 54, 73 and 74 are opened and Bed A continues to depressurize while supplying purge gas to Bed D via segregated tank No. 2 (ST2). These storage vessels are flow-through and baffled as described in U.S. Pat. No. 5,258,059 (Yamaguchi et al., 1993). During the same time, valves 13, 43, 77 and 78 are opened to allow feed gas to flow through Bed C. In addition, valve 21 is opened and Bed A undergoes countercurrent depressurization to supply burner fuel.

Step IV: (PPG): Valves 32, 34, 62, 64, 71, 72, 75 and 76 are closed; valves 51, 52, 73 and 74 are opened. The bed continues to depressurize while supplying product purge gas to the bottom of the purge vessel, Segregated Tank No. 2 (ST2). Again, this storage vessel is flow-through and baffled as described previously. During the same time, valves 13, 21, 43, 77 and 78 remain opened, and valve 44 is opened to allow Bed D to receive product pressurization gas from Bed C.

Step V: (BD): Valves 21, 44, 51, 52, 73 and 74 are closed; valve 22 is opened and Bed B continues to depressurize supplying burner gas to the steam methane reformer until the minimum bed pressure is achieved. During the same time, valves 14, 44, 77 and 78 are opened to allow feed gas to flow through Bed D. In addition, valves 31, 33, 61, 63, 71, 72, 75 and 76 are opened, and Beds A and C undergo simultaneous top-to-top and bottom-to-bottom bed equalization via segregated tanks ST1 and ST3, respectively.

Step VI: (PG): Valve 22 remains open; valves 52, 53, 73 and 74 are opened. The bed is purged countercurrently from the top using gas from the bottom of the purge storage vessel (ST2). During the same time, valves 14, 44, 77 and 78 remain opened, and valve 41 is opened to allow Bed A to receive product pressurization gas from Bed D.

Step VII: (EQU): Valves 14, 41, 44, 52, 53 73 and 74 are closed; valves 32, 34, 62, 64, 71, 72, and 75 and 76 are opened. The bed is simultaneously pressurized with equalization gas from both the top and the bottom equalization vessels (ST1 and ST3). During the same time, valves 11, 41, 77 and 78 are opened to allow feed gas to flow through Bed A. In addition, valve 23 is opened, and Bed C undergoes countercurrent depressurization to supply burner fuel.

Step VIII: (PP): Valves 32, 34, 62, 64, 71, 72, and 75 and 76 are closed; valves 41 and 42 are opened to allow Bed B to receive product pressurization gas from Bed A. The pressurization continues to the maximum operating pressure using product supplied by Bed A which is on the adsorption step. During the same time, valves 11, 23, 41, 77 and 78 remain opened, and Bed A continues to receive feed gas. In addition, valves 53, 54, 73 and 74 are opened to allow Bed C to receive purge gas from Bed D via segregated Tank No.2 (ST2).

Figure 5:
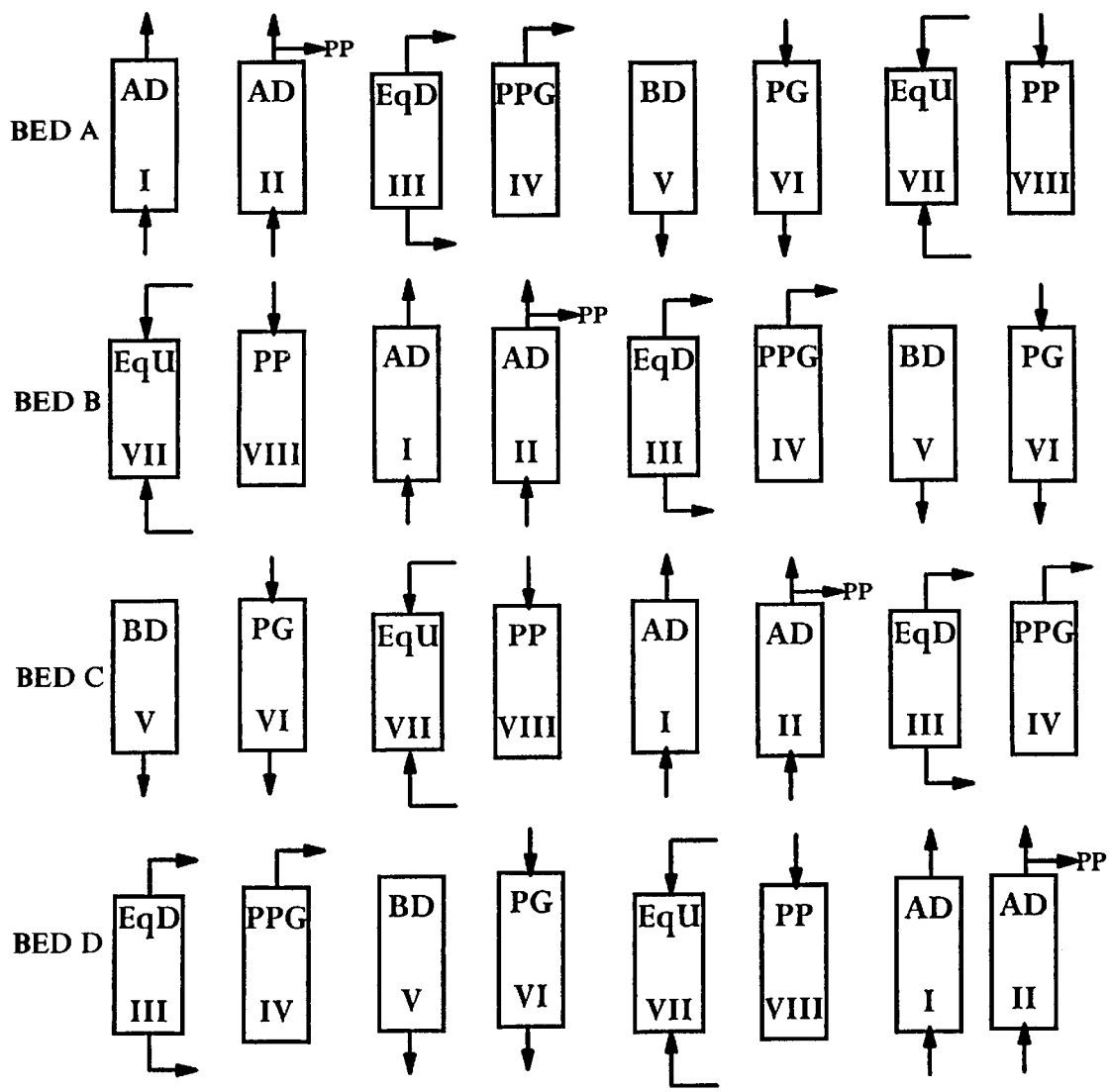
FIG. 5 is a schematic diagram of a four bed PSA column cycle wherein a segregated storage tank or tanks is (are) not used. This is outside the scope of the present invention.

Tables 1 and 2 give examples of the operating conditions and the PSA process performance using three layers of adsorbents (e.g. as in FIG. 2: alumina at the feed end (B1), followed by activated carbon (B2), then Na-Y zeolite at the product end of the bed (B3)). In Table 1, the results are in accordance with this invention that used segregated tanks to achieve concentration reversal during purging and repressurization steps at both ends of the bed. The comparative data in Table 2 is from exactly the same PSA cycle, but without any concentration reversal. For clarity, the PSA cycle used to obtain the results of Table 2 is shown in FIG. 5. Note from FIGS. 4 and 5, the only difference in the PSA cycles is the use of the segregated tanks in FIG. 4 to achieve concentration reversal during the purging and repressurization steps at both ends of the bed.

In the tables, the symbols have the following meaning: kPa 1000 Pa=S.I. unit for pressure (1.0 atm.=101.325 kPa, s=time unit in seconds, m=meter, and NCFH=Normal cubic foot per hour.

Table 1: A non-limiting example using this invention and three layers of adsorbents in the four-bed PSA process depicted in FIGS. 2–4. The results shown below were obtained from PSA simulations using synthesis gas (dry basis:74.03% H₂, 22.54% CO₂, 0.36% CO, 2.16% CH₄, and 0.91% N₂) as the feed. The feed typically contains about 1500 ppm H₂O.

| | |
|---|---|
| Layer 1 Adsorbent: | Alumina |
| Layer 1 Bed Height | 0.1270 m |
| Amount of Alumina: | 97.663 Kg per bed |

-continued

| | |
|---|---|
| Layer 2 Adsorbent: | Activated Carbon |
| Layer 2 Bed Height | 1.7907 m |
| Amount of Carbon: | 900 Kg per bed |
| Layer 3 Adsorbent: | Na—Y Zeolite |
| Layer 3 Bed Height | 0.1270 m |
| Amount of Zeolite: | 514 Kg per bed |
| Cycle Time (s) | 960 |
| High Pressure: | 1187.53 kPa |
| Low Pressure: | 144.57 kPa |
| Feed Rate: | 184.1 NCFH |
| Hydrogen Purity: | 99.55% |
| Hydrogen Recovery: | 80.11% |
| Temp (K.): | 300 |

Table 2 An example using three layers of adsorbents in the four-bed PSA process depicted in FIG. 5 without the use of segregated tank(s), i.e., no concentration reversal used at either end of the bed. The results shown below were obtained from PSA simulations using synthesis gas (dry basis:74.03% $H_2$, 22.54% $CO_2$, 0.36% CO, 2.16% $CH_4$, and 0.91% $N_2$) as the feed. The feed typically contains about 1500 ppm H2O.

| | |
|---|---|
| Layer 1 Adsorbent: | Alumina |
| Layer 1 Bed Height | 0.1270 m |
| Amount of Alumina: | 97.663 Kg per bed |
| Layer 2 Adsorbent: | Activated Carbon |
| Layer 2 Bed Height | 1.7907 m |
| Amount of Carbon: | 900 Kg per bed |
| Layer 3 Adsorbent: | Na—Y Zeolite |
| Layer 3 Bed Height | 0.1270 m |
| Amount of Zeolite: | 514 Kg per bed |
| Cycle Time (s): | 960 |
| High Pressure: | 1187.53 kPa |
| Low Pressure: | 144.57 kPa |
| Feed Rate: | 156.70 NCFH |
| Hydrogen Purity: | 99.6% |
| Hydrogen Recovery: | 71% |
| Temp (K.): | 300 |

Note from Tables 1 and 2 the higher $H_2$ recovery (80.11 versus 71%) for the four-bed PSA process using this invention with segregated tanks for concentration reversal (Table 1) versus the case, wherein no segregated storage tank(s) are used to achieve concentration reversal.

Figure 6:
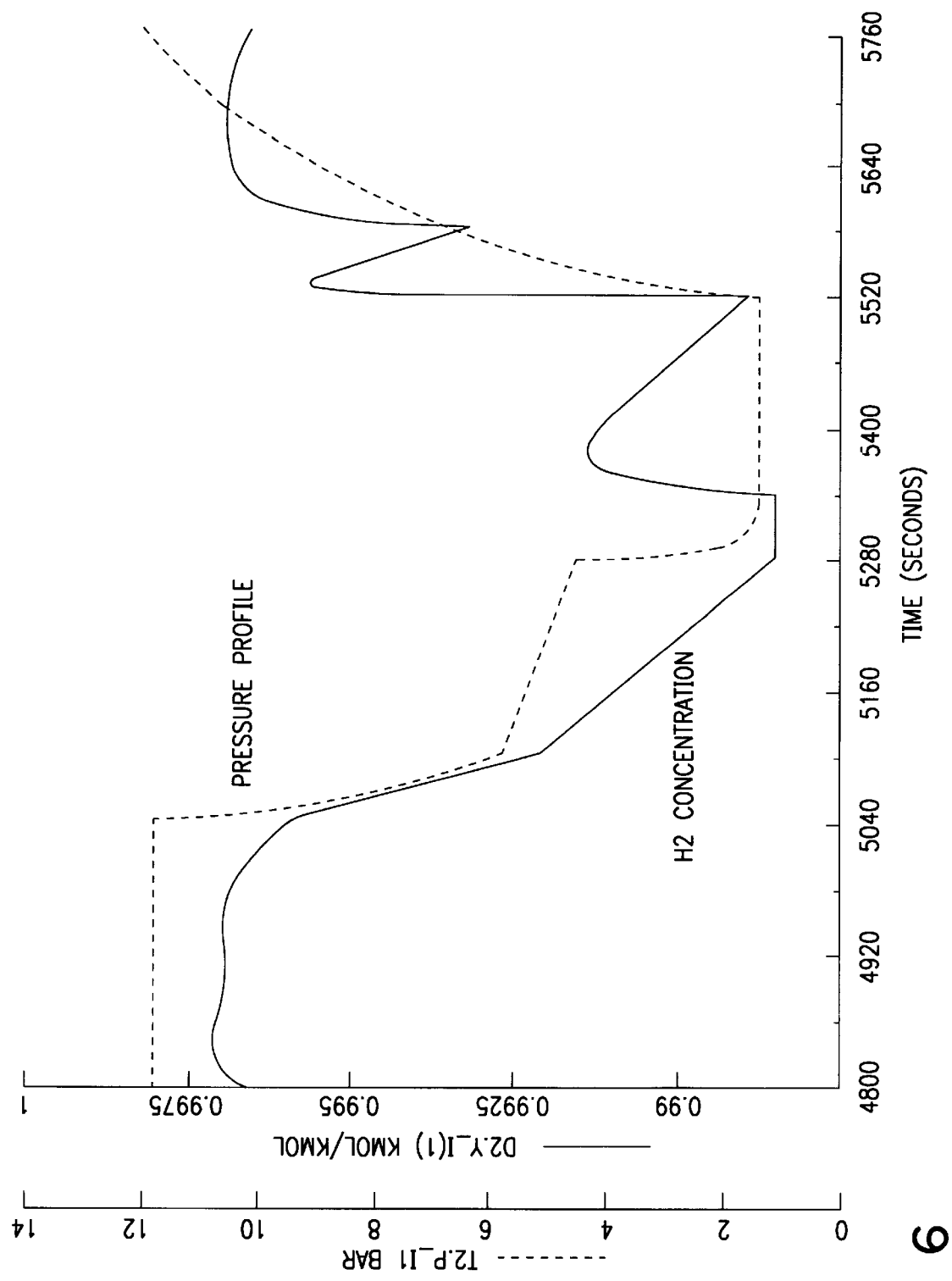
FIG. 6 illustrates PSA simulation results using the PSA cycle of FIG. 5. Pressure and hydrogen concentration profiles at the product end of the bed during one PSA cycle are illustrated.
Figure 7:
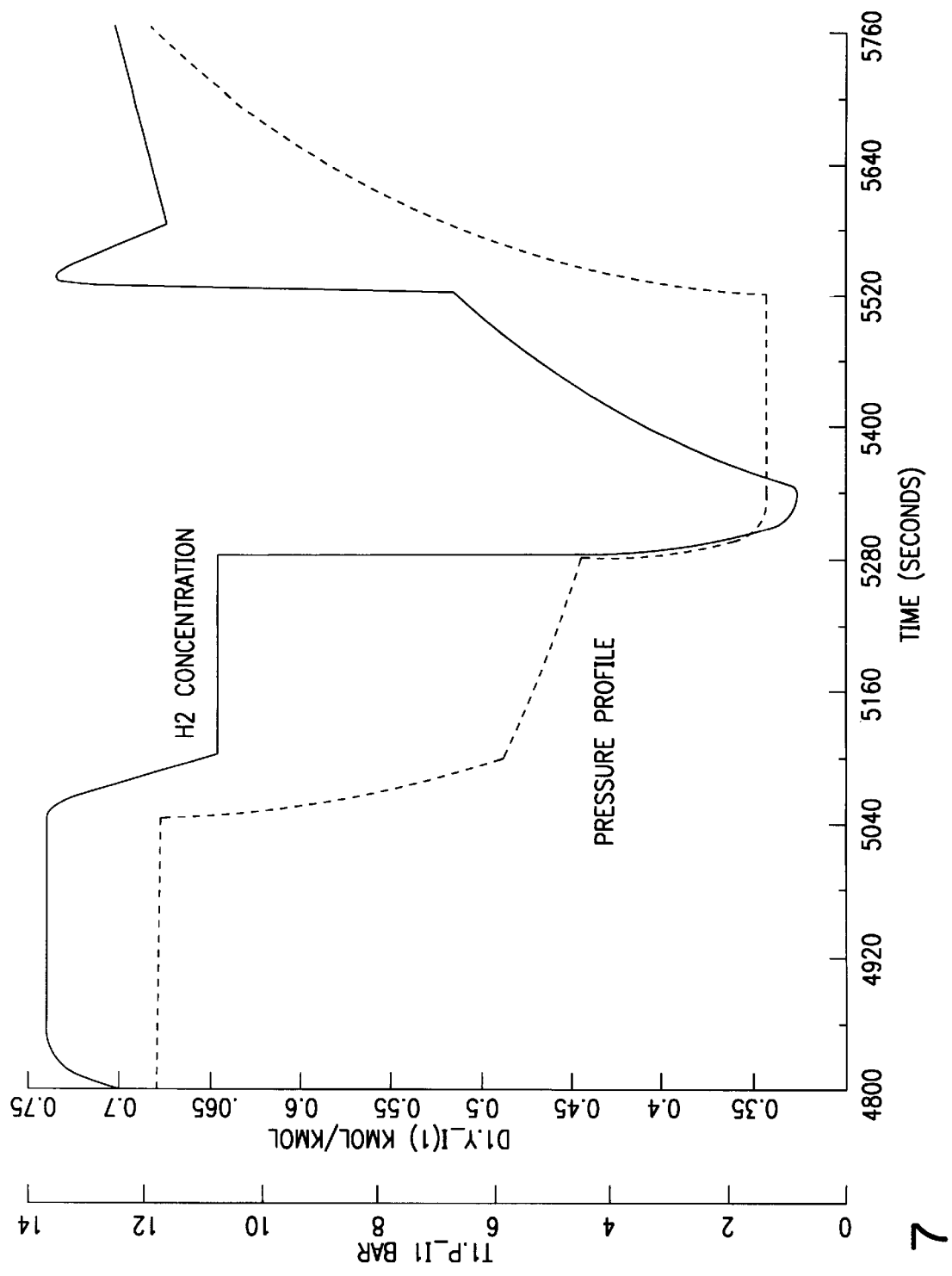
FIG. 7 illustrates PSA simulation results using the PSA cycle of FIG. 5. Pressure and hydrogen concentration profiles at the feed end of the bed during one PSA cycle are illustrated.

In addition, the purity degradation in PSA cycles that do not practice the use of segregated tank(s) for concentration reversal during purging and repressurization step(s) (i.e., gas of decreasing product purity used for refluxing) is shown in FIGS. 6 and 7 for the product end and feed ends of the bed, respectively. For example, FIG. 6 shows that during the purge step and top-to-top bed equalization step, gas of decreasing $H_2$ concentration is being used for refluxing. FIG. 7 shows during the bottom-to-bottom bed equalization step, at the start of the equalization, the $H_2$ mole fraction is 0.7403 (same as the feed concentration), and as the equalization progresses, the hydrogen mole fraction falls from 0.7403 to about 0.64.

Thus, in order to maintain desired product purity in prior art PSA cycles, the production and equalization falling steps must be terminated much earlier than the time required for the bed to breakthrough; thus, the adsorbent bed is not fully utilized. Furthermore, by using products of decreasing purities, for example during the equalization rising and purging steps, additional contamination of the product end of the bed results, due to the use of the lowest purity product gas at the end of the refluxing steps. This added contamination of the product end of the bed, brings about a significant reduction in the product purity in the early stage of the make product step, and causes a decrease of the average purity of the product. In addition, by using product gas of decreasing purity, the spreading of the mass transfer zone is enhanced. Finally, in order to contain the mass transfer zone and maintain product purity, more adsorbent is required, resulting in higher bed size factor and a more costly PSA process.

Figure 8:
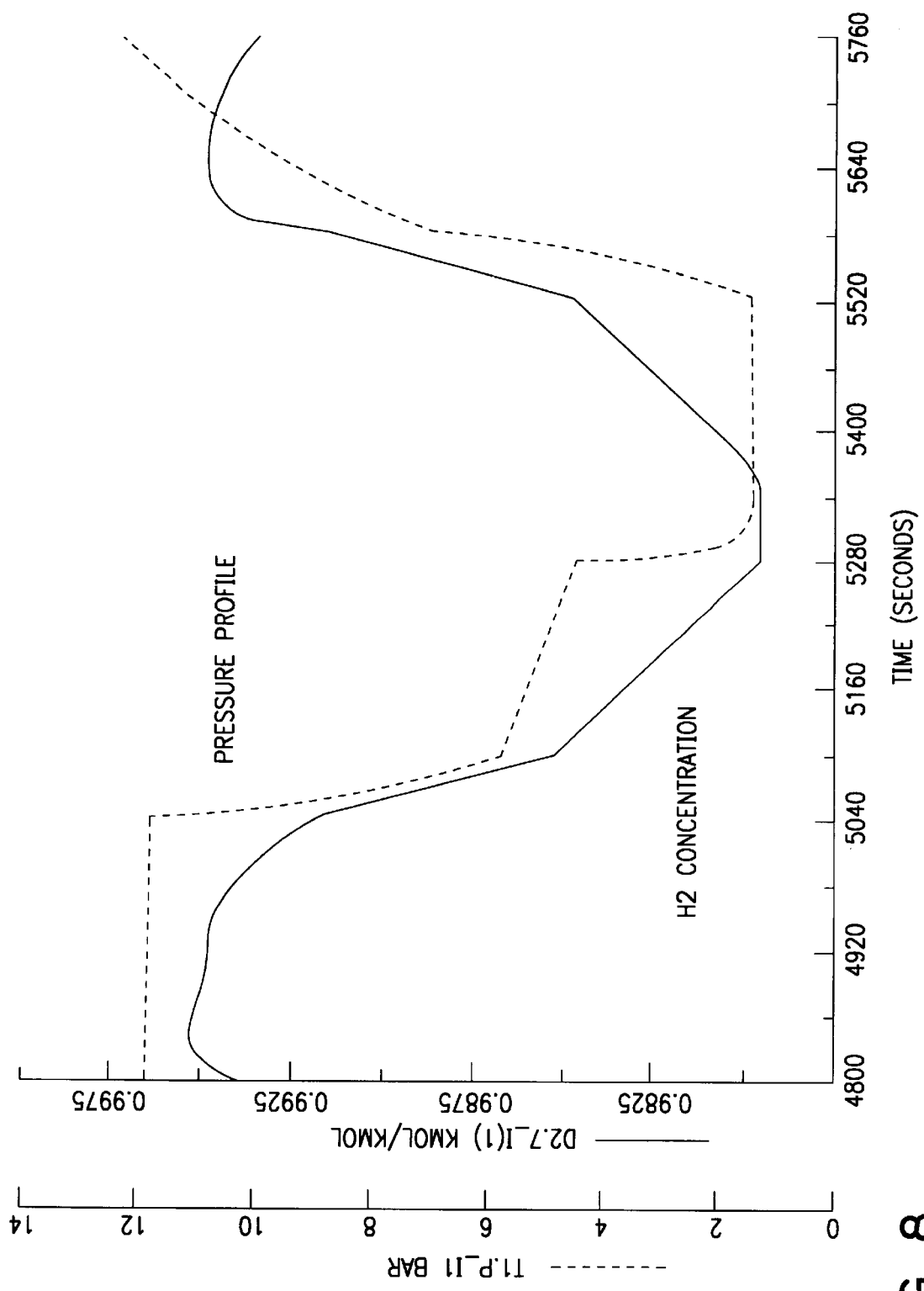
FIG. 8 illustrates PSA simulation results using a PSA cycle (as in FIG. 4) of this invention (see FIG. 4). Pressure and hydrogen concentration profiles at the product end of the bed during one PSA cycle are illustrated.

In order to use the lowest hydrogen purity gas at the start of refluxing, followed by gas of increasing hydrogen purity during purging and repressurization steps, it is necessary to produce multiple hydrogen concentration products. According to this invention, the desirable purity versus time profile at the product end of the bed is shown in FIG. 8; wherein, the highest purity gas for refluxing (purging and top—top bed equalization) is used last. Therefore, to practice the invention described herein, utilization of a product gas of increasing purity is required, as shown in FIG. 8. Thus, we need a reversal of the purity order, and the production of multiple purity products, viz the use of segregated storage tank(s).

Figure 9:
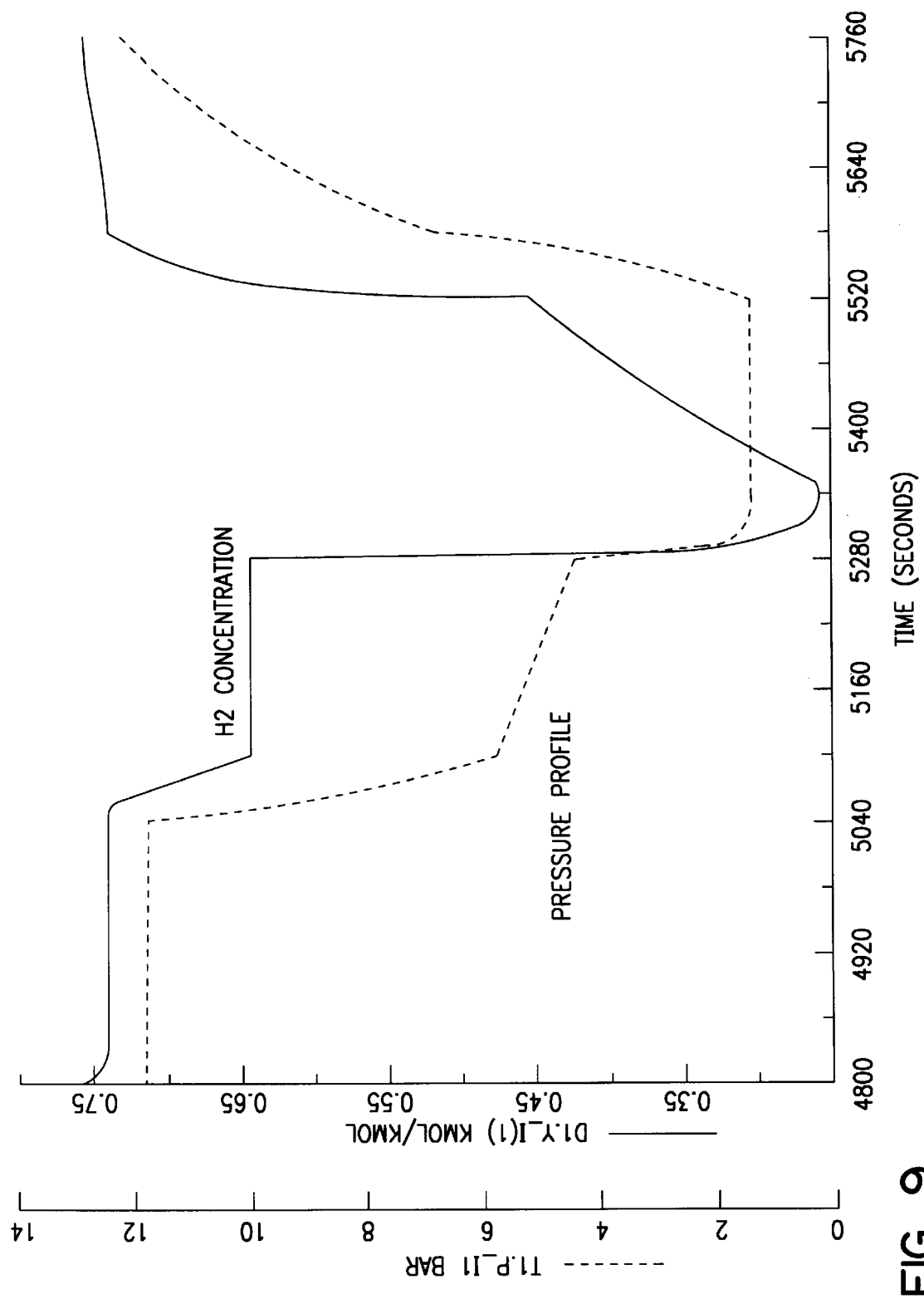
FIG. 9 illustrates PSA simulation results using a PSA cycle (as in FIG. 4) of this invention (see FIG. 4). Pressure and hydrogen concentration profiles at the feed end of the bed during one PSA cycle are illustrated.

FIG. 9 shows the desirable hydrogen concentration profile versus time at the feed end of the bed. Note from FIG. 9 that at the end of the equalization rising step, the concentration of the gas entering the bottom of the bed coincides with the feed concentration. However, in PSA processes that do not practice concentration reversal at the feed end, at the start of the bottom-to-bottom bed equalization step, the concentration of $H_2$ coincides with the feed concentration, then drops as the equalization continues, as shown in FIG. 7.

Since multiple purity products are required for refluxing and product pressurization, the PSA cycle becomes inherently more complicated, and several modes of operation can be envisioned. For example, if hydrogen concentration reversal is required at both ends of the bed, then two segregated storage tanks can be used, one at each end of the bed. Typical segregated storage tank designs could be of the type described by Yamaguchi et al., U.S. Pat. No. 5,258,059, or could be a vessel packed with layer(s) of adsorbent(s) or inert materials, or simply an empty column containing baffles to suppress mixing.

By incorporating segregated storage tanks in the PSA cycle, we are able to store multiple hydrogen concentration gases, which can be used in the order of increasing hydrogen concentration for purging and repressurization. For example, the gas collected during the equalization falling step is stored in the segregated storage tank. At the beginning of the equalization rising step, the lowest purity gas from the segregated storage tank is consumed first, then product of increasing purity is used at a later time.

Note that in this example (see table 1 and FIGS. 3, 4 and FIG. 8 versus FIG. 6), during the equalization falling step, product gas of decreasing purities enters the segregated storage tank, and leaves the storage tank in the reverse order (increasing product purities) during the equalization rising step. Similarly, by using another segregated storage tank at the feed end of the bed, the gas collected at the feed end of the bed during depressurization is used in the order of increasing hydrogen concentration during the equalization rising step (see FIGS. 3, 4 and 9 versus 7).

The incorporation of the segregated storage tanks in the PSA cycle to facilitate purity reversal at both ends of the bed, allows for greater process flexibility and improvement in the efficiency, when compared to prior art PSA cycles. In particular, for a given PSA cycle, the inclusion of the segregated storage tank, in accordance with this invention (see Table 1), results in 10–15% higher $H_2$ recovery when compared with the same PSA cycle without the use of concentration reversal at both ends of the bed during purging and repressurization steps (see Table 2).

Figure 10:
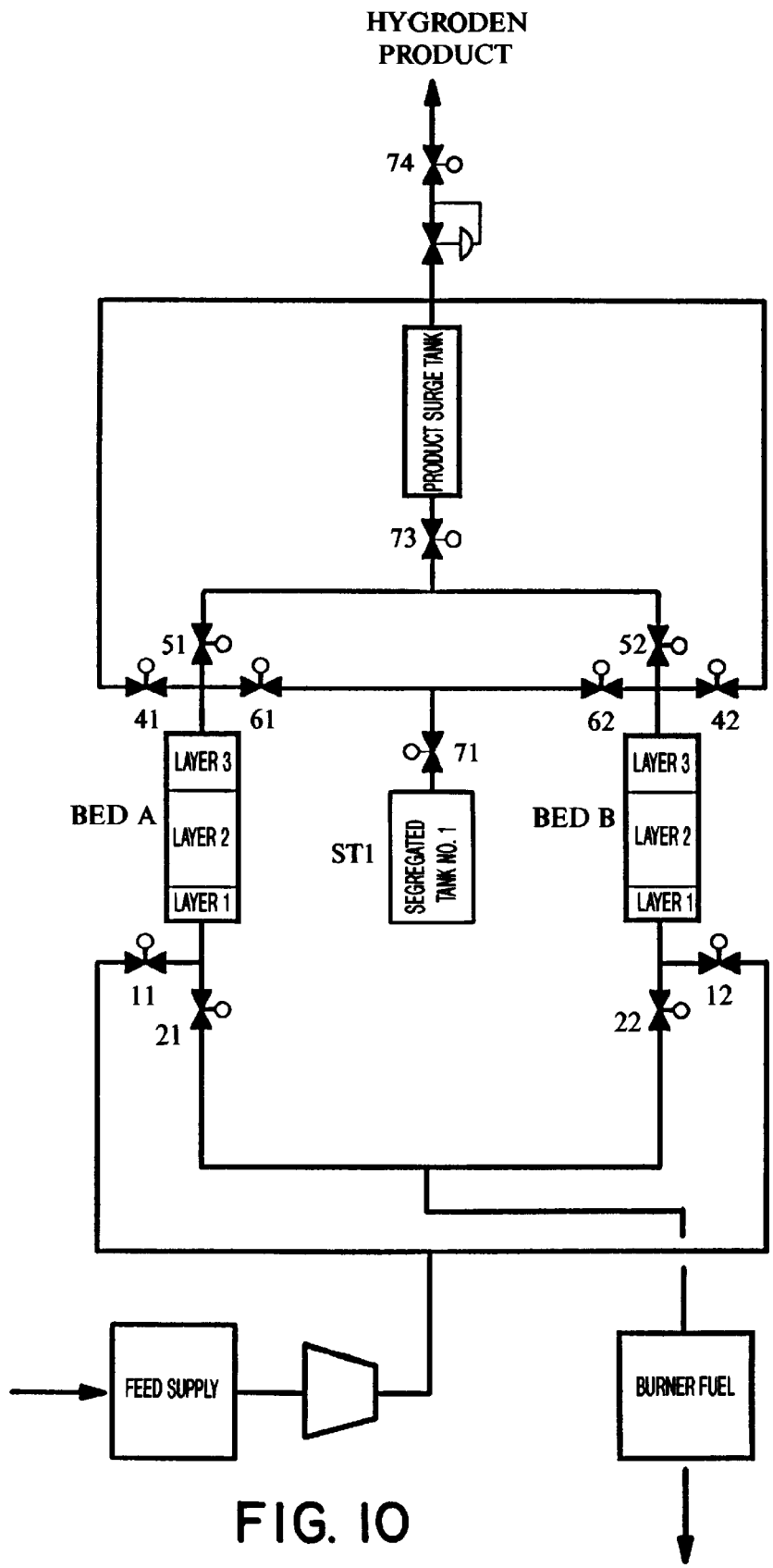
FIG. 10 illustrates another embodiment of the invention using a two bed PSA process using reverse purity profile at the product end of the bed.
Figure 11:
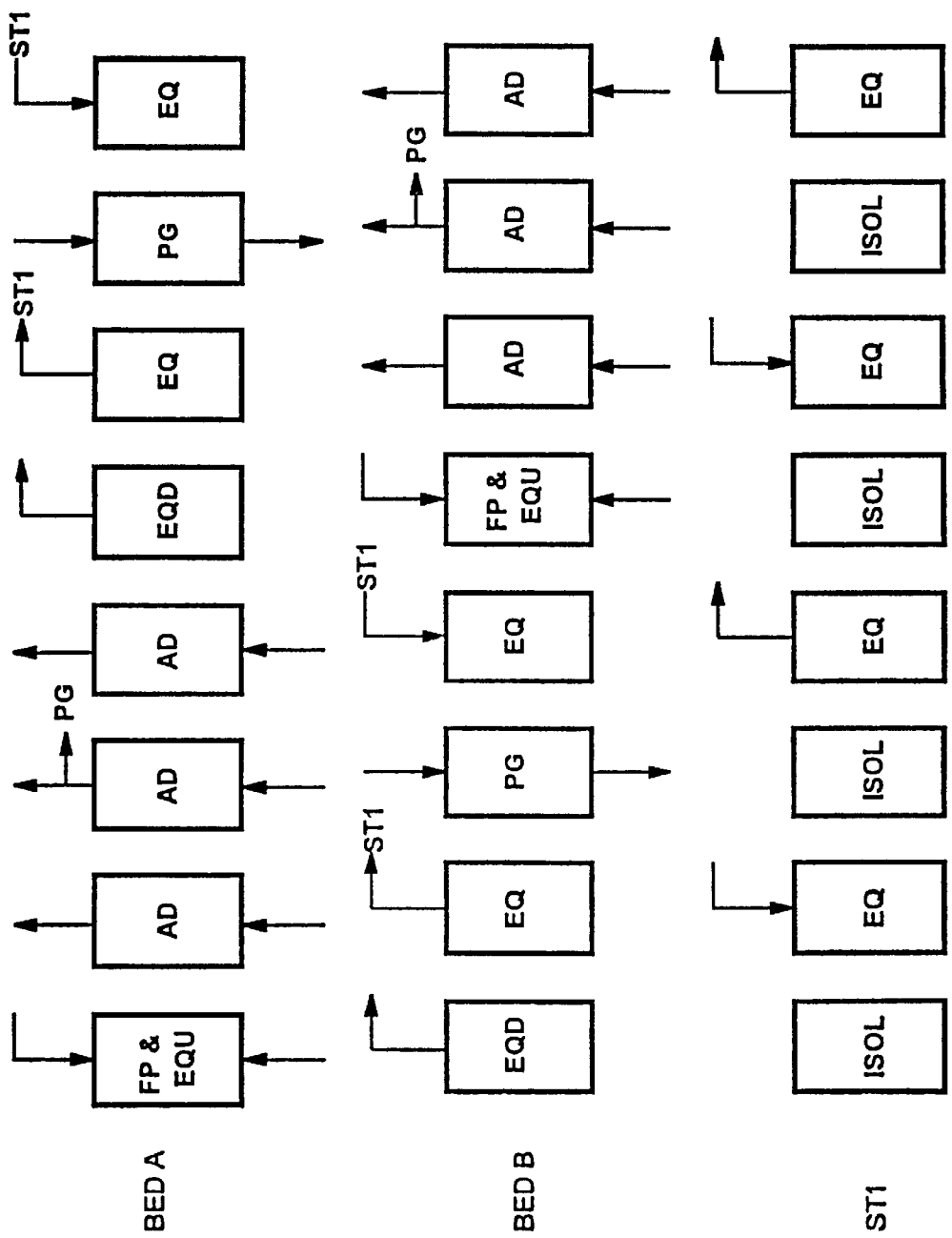
FIG. 11 illustrates an embodiment of the invention involving a two bed PSA column cycle using reverse purity profile at the product end of the bed.

In an alternative mode of operation, FIGS. 10 and 11 show the PSA process and the sequence of steps, respectively, for a two-bed Hydrogen PSA process using Reverse Purity Profiles at the top end, i.e. the product end of the bed. Referring to FIGS. 10 and 11 the two-bed PSA process is now described with respect to Bed A.

Step I: (FP & EQU) Feed gas (e.g., $H_2$ synthesis gas) is introduced at the bottom of the Bed A and equalization gas from Bed B is introduced at the top of Bed A. In our example, valves 11, 61, and 62 (see FIG. 10) are opened. Bed B is on the equalization falling step. After Beds A and B are substantially equalized in pressure, then valves 61 and 62 are closed, and valve 41 is open to allow gas from the product source tank to enter the top of Bed A to complete the pressurization step. At the end of this step, Bed A is pressurized to the adsorption pressure.

Step II: (AD): Valve 41 is closed. Valve 11 remains open as in Step I. In addition, valves 51, 62, 71, 73 and 74 are opened. This allows feed gas to flow through the Bed A and allows Bed B to supply equalization gas to the segregated storage vessel (ST1).

Step III: (AD): Valves 11, 51, 62, 73, and 74 remain open with Bed A on adsorption. In addition, valves 22, 61 and 62 are opened, this supplies purge gas to Bed B. Bed B is on the purge step.

Step IV: (AD): Valves 22 and 61 are closed. Valves 11, 51, 71, 73 and 74 are open with Bed A on adsorption. Bed B is on the equalization raising step, receiving gas from the segregated storage vessels (ST1 and ST2).

Step V: (EQD): Valves 11, 51, 71, 73 and 74 are closed; valves 61 and 62 are opened. Bed A is partially equalized with Bed B. In addition, valve 12 is open and Bed B is undergoing feed pressurization and equalization raising step. After Beds A and B are substantially equalized in pressure, then valves 61 and 62 are closed, and valve 42 is open to allow gas from the product source tank to enter the top of Bed B to complete the pressurization step. At the end of this step, Bed B is pressurized to the adsorption pressure.

Step VI: (EQ): Valve 42 is closed; valve 12 remains open. In addition, valves 52, 61, 71, 73 and 74 are open, while Bed A continues to depressurize to supply equalization gas to the segregated vessel (ST1). During the same time, Bed B is on an adsorption step.

Step VII: (PG): Valve 71 is closed. Valve 61 remains open, in addition valves 62 and 21 are opened. Bed A is purged with product from Bed B and the waste stream is sent back to the steam methane reformer as burner gas. Bed B is on an adsorption step.

Step VIII: (PP): Valve 21 is closed. Valves 61 and 71 remain open. open. Bed A undergoes partial repressurization receiving equalization gas from the segregated vessel (ST1). Bed B is on an adsorption step.

Figure 12:
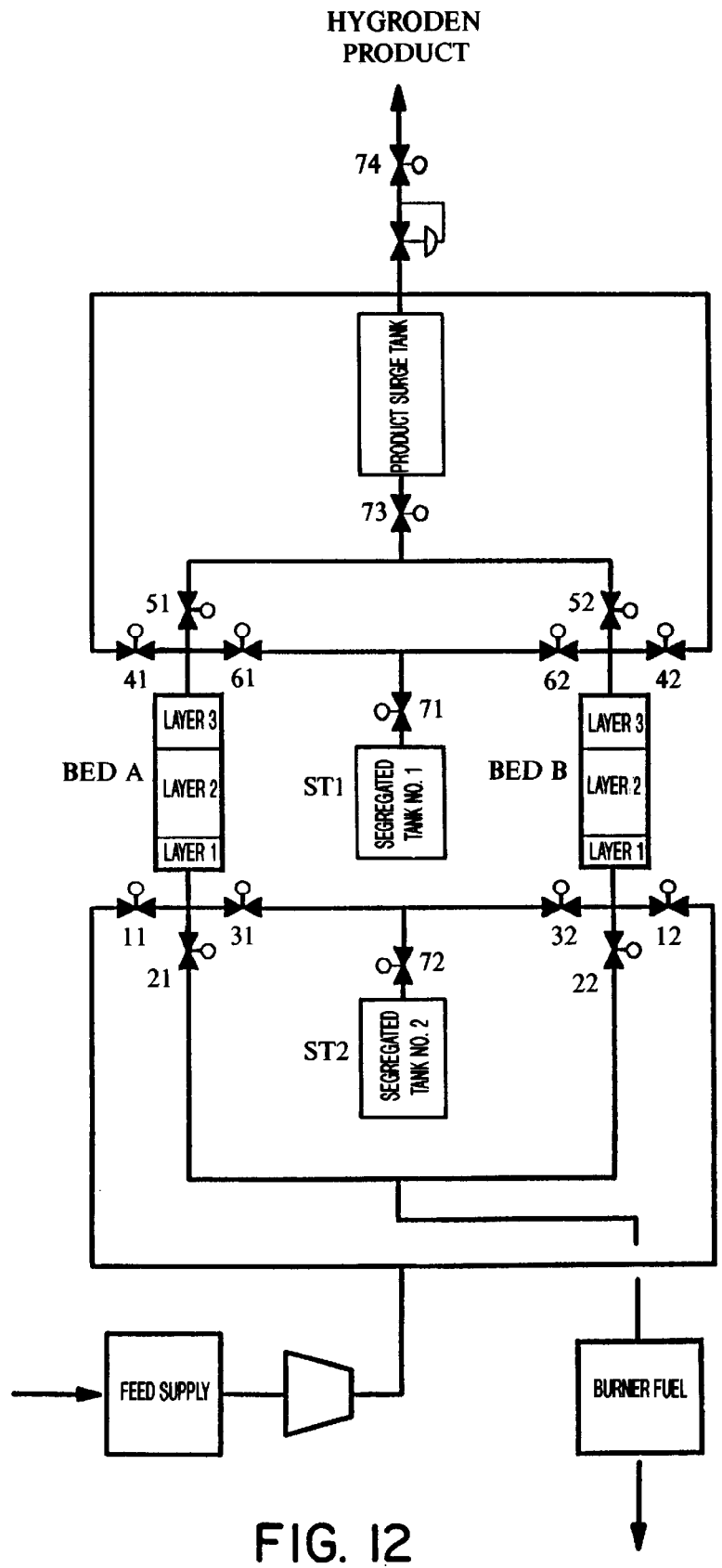
FIG. 12 illustrates an embodiment of the invention involving a two bed PSA process using reverse purity profile at both ends of the bed.
Figure 13:
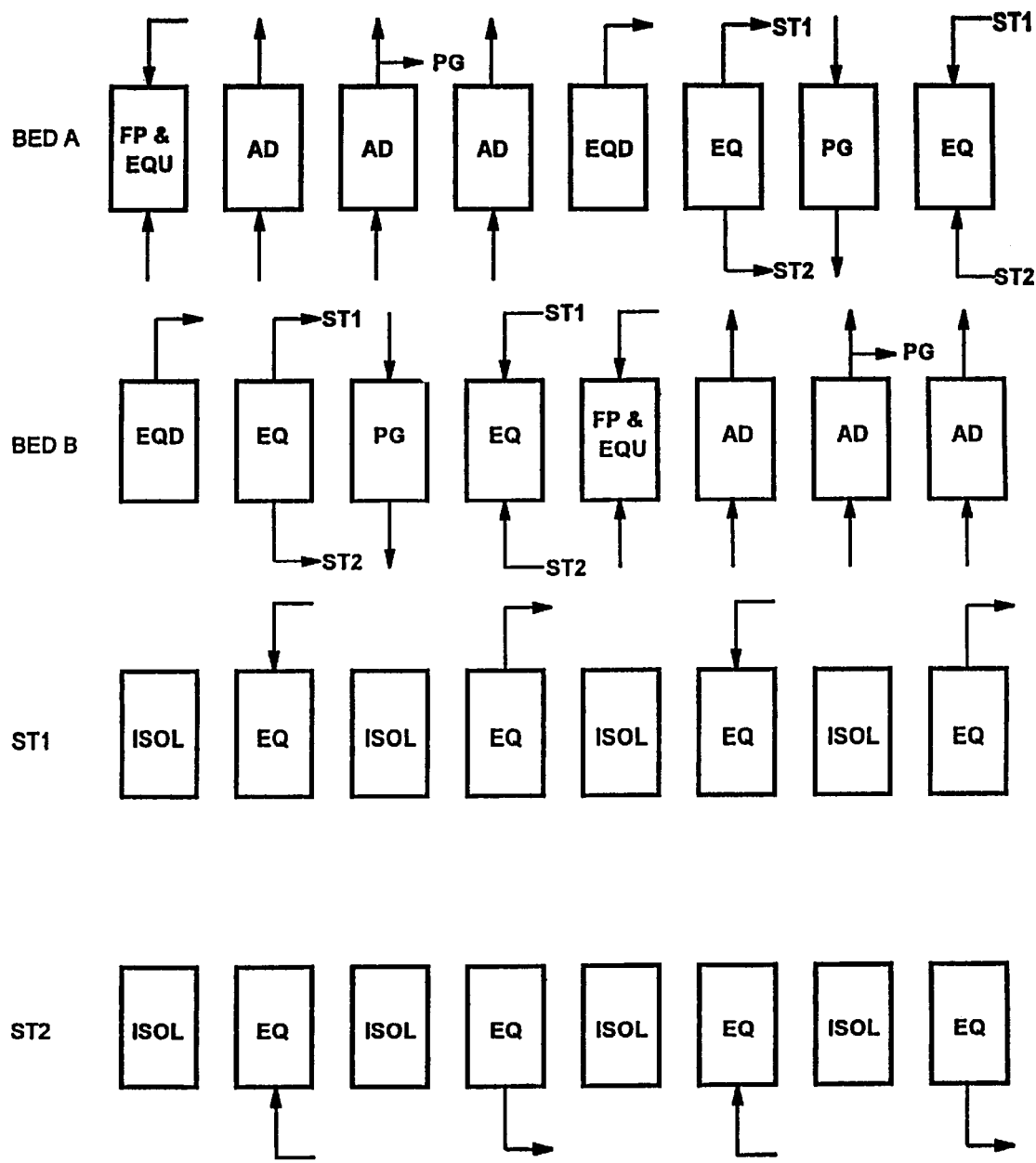
FIG. 13 illustrates an embodiment of the invention involving a two bed PSA column cycle using reverse purity profile at both ends of the bed.

In another alternative mode of operation, FIGS. 12 and 13 show the PSA process and the sequence of steps, respectively, for a two-bed Hydrogen PSA process using Reverse Purity Profiles at both ends, i.e. the product and feed ends of the bed. Referring to FIGS. 12 and 13 the two-bed PSA process is now described with respect to Bed A.

Step I: (FP & EQU) Feed gas (e.g., $H_2$ synthesis gas) is introduced at the bottom of the Bed A and equalization gas from Bed B is introduced at the top of Bed A. In our example, valves 11, 61, and 62 (see FIG. 12) are opened. Bed B is on the equalization falling step. After Beds A and B are substantially equalized in pressure, then valves 61 and 62 are closed, and valve 41 is open to allow gas from the product source tank to enter the top of Bed A to complete the pressurization step. At the end of this step, Bed A is pressurized to the adsorption pressure.

Step II: (AD): Valve 41 is closed. Valve 11 remains open as in Step I. In addition, valves 32, 51, 62, 71, 72, 73 and 74 are opened. This allows feed gas to flow through the Bed A while Bed B is depressurizing, supplying equalization gas to the top and bottom of the segregated storage vessels (ST1 and ST2).

Step III: (AD): Valves 32 71 and 72 are closed. Valves 11, 51, 62, 73 and 74 remain open with Bed A on adsorption. In addition, valves 22, 61 and 62 are opened, this supplies purge gas to Bed B. Bed B is on the purge step.

Step IV: (AD): Valves 22 and 61 are closed. Valves 11, 51, 62, 73 and 74 remain open with Bed A on adsorption. Also, valves 32, 71 and 72 are open, and Bed B is on the equalization raising step, receiving gas from both the top and bottom segregated storage vessels (ST1 and ST2).

Step V: (EQD): Valves 11, 32, 51, 71, 72, 73 and 74 are closed; valves 61 and 62 are opened. Bed A is partially equalized with Bed B. In addition, valve 12 is open, and Bed B is undergoing feed pressurization and equalization raising step. After Beds A and B are substantially equalized in pressure, then valves 61 and 62 are closed, and valve 42 is open to allow gas from the product source tank to enter the top of Bed B to complete the pressurization step. At the end of this step, Bed B is pressurized to the adsorption pressure.

Step VI: (EQ): Valve 42 is closed; valve 12 remains open. In addition, valves 31, 52, 61, 71, 71, 72, 73 and 74 are opened. This allows feed gas to flow through Bed B while Bed A is depressurizing, supplying equalization gas to both the top and bottom segregated vessels (ST1 and ST2). During the same time Bed B is on an adsorption step.

Step VII: (PG): Valves 31, 71 and 72 are closed. Valves 12, 52, 61, 71, 73 and 74 remain open, in addition valves 62 and 21 are opened. Bed A is purged with product from Bed B and the waste stream is sent back to the steam methane reformer as burner gas. Bed B is on an adsorption step.

Step VIII: (PP): Valves 21 and 62 are closed. Valves 12, 52, 61, 73 and 74 remain open. Valves 31, 71 and 72 are opened. Bed A undergoes partial repressurization by simultaneously receiving equalization gas from both the top and bottom segregated vessels (ST1 and ST2). Bed B is on an adsorption step.

Based on the PSA cycles described above, several modifications can be made to alter one or more of the steps without deviating from the application or the general features of the invention. For example, the top-to-top and bottom-to-bottom repressurization steps can occur as sequentially rather than simultaneously as described above.

In addition, since various amounts of multiple purity products are collected, the time allocated and the process control of each step becomes crucial in the operation of the PSA cycle. Also, further improvements in the PSA cycle that utilized the segregated storage tank, include the overlapping of various steps in the PSA cycle to reduce total cycle time, the choice of operating conditions (high pressure, low pressure, pressure at the end of equalization falling step, etc.), the times allocated for each step, and the order in which each step of the cycle is executed.

In another mode of operation, the segregated equalization tank (e.g. ST1) can be eliminated from the process, and all of the equalization falling gas goes directly to the other bed, i.e., direct bed-to-bed equalization is allowed. However, in this mode of operation, during the bed-to-bed equalization step, the bed undergoing the equalization rising step, receives product gas of decreasing purity (in this invention, we want to use product of increasing purity). Upon the completion of the equalization rising step, the bed is pressurized with product from another bed that is in the production step, or undergoes feed pressurization, or product and feed pressurization simultaneously.

Although the invention described here uses a segregated product storage tanks (ST1, ST2 and ST3), multiple storage tanks can be conceived, wherein the effluent gas is directed to the respective tank at different times in the make product step. Also, this invention is not restricted to the use of cylindrical adsorbent beds with shallow dished heads on the top and bottom, and gas flow in the axial direction, i.e., other bed configurations may be used. For example, radial beds may be used to achieve a reduction in pressure losses with a concomitant reduction in power consumption. In addition, mixed layered beds can be used with mixed adsorbents packed in each layer at various positions in the bed. For example, Na-Y zeolite mixed with alumina and pelletized could be placed at the feed end of the bed to remove water and carbon dioxide from the feed stream, then subsequent layers are placed on top of the mixed alumina zeolite composite to perform the separation of synthesis gas to produce hydrogen enriched product.

In addition, using multiple storage tanks allow for greater flexibility in the process. For example, the individual steps in the cycle shown in FIG. 4 do not have to occupy fixed periods of time. Thus, physical variables such as pressure and composition can be used easily to determine the time allocated for each step; thereby, adjusting the process for changes in temperature, pressure and variable product demand. Since no bed-to-bed gas transfer is required when additional storage tanks are used, then it is possible to run each bed independently, and regard the process as a collection of single bed units. However, for proper sizing and sharing of compressor(s) and vacuum pump(s), some synchronization of the overall cycle of each bed with the cycles of the other beds is necessary.

Finally, although the PSA cycle has been described in relation to hydrogen production from synthesis gas, wherein particular embodiments have been shown, other embodiments are contemplated along with modification of the disclosed features as being within the scope of the invention. The aforementioned embodiments with the implied modifications are also applicable to other PSA separation processes. Also, although the PSA cycles described herein utilized super-atmospheric cycles, it should be noted that the PSA cycle is not restricted to super-atmospheric pressure swing adsorption (PSA) cycles, and trans-atmospheric or subatmospheric PSA cycles may also be used. In addition, the PSA process of this invention could also be used for separating other mixtures (e.g. air) to produce oxygen, or nitrogen, or oxygen and nitrogen co-product).

The invention allows for the use of the highest purity gas last, or the use of products of increasing purity in the equalization rising, purging and product pressurization steps, instead of the reverse order as in the prior art. In addition the invention allows for operation of the PSA process in such a manner that at the end of the bottom-to-bottom bed equalization step, the concentration at the feed end of the bed coincides with the feed concentration. Note that in prior art PSA processes, during the bottom-to-bottom bed equalization step, the concentration at the feed end of the bed deviates from the feed concentration as the bottom-to-bottom bed equalization progresses with rising heavy component(s) concentrations.

Thus, the inventive reversal of the concentrations at both the top and bottom ends of the bed, via the use of segregated storage tanks, allows for the reversal of the purity order and the use of multiple product purities in the proper sequence to remove the inherent problems in prior art PSA cycles. Further, since, multiple purity products are required, the adsorbent bed is fully utilized, i.e., the bed may be kept onstream just prior to the heavy component(s) breakthough at the effluent end of the bed.

Specific features of the invention are shown in one or more of the drawings for convenience only, as such feature may be combined with other features in accordance with the invention. Alternative embodiments will be recognized by those skilled in the art and are intended to be included within the scope of the claims.

What is claimed is:

1. A process for the separation of one or more selectively adsorbable components from a gas mixture including a less selectively adsorbable component, wherein the gas mixture is contacted in one or more fixed adsorbent beds containing adsorbent material selective for the adsorption of said one or more selectively adsorbable components by means of cyclic steps comprising:

(a) adsorption, during which the gas mixture is passed into said one or more fixed adsorbent beds in contact with the adsorbent at an upper adsorption pressure and said one or more selectively adsorbable components of the gas mixture are selectively adsorbed and the less selectively adsorbable component thereof is recovered from the product end of said one or more fixed adsorbent beds; and (b) depressurization, during which the passage of the gas mixture into said one or more fixed adsorbent beds is discontinued and the pressure in the bed is reduced from the upper adsorption pressure to a lower desorption pressure to desorb and recover said one or more selectively adsorbable component from said one or more fixed adsorbent beds;

wherein i) a first portion of said less selectively adsorbable component is passed from the product end of said one or more fixed adsorbent beds to one or more external, segregated gas storage tank(s) adapted for precluding mixing of gas passed thereto, said first portion passed to said external, segregated gas storage tank(s) being initially of higher purity, followed by lower purity, without passage of any of said first portion directly from one of said one or more fixed adsorbent beds to another;

ii) said first portion from said external, segregated gas storage tank(s) is passed to the product end of said one or more fixed adsorbent beds initially at said lower desorption pressure for repressurization to an intermediate pressure with said first portion at said lower purity being initially passed from said external segregated gas storage tank(s), followed by said first portion at said higher purity, said one or more fixed adsorbent beds thereby having said first portion of said less selectively adsorbable component of increasingly higher purity therein at the product end thereof, iii) a portion of said less selectively adsorbable component utilized to purge said one or more fixed adsorbent beds during step (b) is recovered from the product end of said one or more fixed adsorbent beds and is passed from said product end of said one or more fixed adsorbent beds to said one or more external, segregated gas storage tank(s) adapted for precluding mixing of gas passed thereto, said portion passed to said external, segregated gas storage tank(s) being initially of higher purity, followed by lower purity, without passage of any of said portion directly from one of said one or more fixed adsorbent beds to another;

iv) simultaneously with step (ii) recovering feed end gas from the feed end of said one or more adsorbent beds and passing said feed end gas recovered from the feed end of said one or more fixed adsorbent beds to said one or more external, segregated gas storage tank(s) adapted for precluding mixing of gas passed thereto, said feed end gas passed to said external, segregated gas storage tank(s) being initially of higher purity, followed by lower purity, without passage of any of said feed end gas directly from one of said one or more fixed adsorbent beds to another;

v) said feed end gas recovered from said feed end of said one or more fixed adsorbent beds in said external, segregated gas storage tank(s) is passed to the feed end of said one or more fixed adsorbent beds initially at said lower adsorption pressure for repressurization to said intermediate pressure with said feed end gas having a lower purity being initially passed from said external segregated gas storage tank(s), followed by said feed end gas having a higher purity, said one or more fixed adsorbent beds thereby having gas of increasingly higher purity therein at the feed end thereof.

2. The process of claim 1 in which said gas mixture comprises synthesis gas, with hydrogen comprising the less readily adsorbable component.

3. The process of claim 1 in which said first portion is passed, in said step (i), to a single external, segregated gas storage tank.

4. The process of claim 1 in which said portion is passed, in said step (iii) to a single external, segregated gas storage tank.

* * * * *